US012536081B2

(12) United States Patent
Sasaki

(10) Patent No.: US 12,536,081 B2
(45) Date of Patent: Jan. 27, 2026

(54) TERMINAL MONITORING METHOD, PROGRAM, AND TERMINAL MONITORING SYSTEM

(71) Applicant: Panasonic Intellectual Property Management Co., Ltd., Osaka (JP)

(72) Inventor: Koji Sasaki, Osaka (JP)

(73) Assignee: PANASONIC PROJECTOR & DISPLAY CORPORATION, Osaka (JP)

( * ) Notice: Subject to any disclaimer, the term of this patent is extended or adjusted under 35 U.S.C. 154(b) by 0 days.

(21) Appl. No.: 17/466,625

(22) Filed: Sep. 3, 2021

(65) Prior Publication Data

US 2022/0075701 A1 Mar. 10, 2022

(30) Foreign Application Priority Data

Sep. 8, 2020 (JP) ................ 2020-150770

(51) Int. Cl.
*G06F 11/30* (2006.01)
*G06F 11/32* (2006.01)
*H04L 43/04* (2022.01)

(52) U.S. Cl.
CPC ........ *G06F 11/3006* (2013.01); *G06F 11/328* (2013.01); *H04L 43/04* (2013.01); *G06F 2201/81* (2013.01); *G06F 2201/86* (2013.01)

(58) Field of Classification Search
None
See application file for complete search history.

(56) References Cited

U.S. PATENT DOCUMENTS

| 6,345,220 B1* | 2/2002 | Ikegami ............ B60R 21/01556 701/45 |
| 6,920,112 B1* | 7/2005 | McCloghrie .......... H04L 43/022 710/33 |
| 2001/0010717 A1* | 8/2001 | Goto .................... H04M 15/00 379/127.01 |
| 2003/0126326 A1 | 7/2003 | Nomizo et al. |

(Continued)

FOREIGN PATENT DOCUMENTS

| JP | 11-55294 | 2/1999 |
| JP | 2000-259520 | 9/2000 |

(Continued)

*Primary Examiner* — Lance Leonard Barry
(74) *Attorney, Agent, or Firm* — Wenderoth, Lind & Ponack, L.L.P.

(57) ABSTRACT

A terminal monitoring system monitors a plurality of terminals connected to a network. The terminal monitoring system includes an acceptance processor, a setting processor, an acquisition processor, and a display processor. The acceptance processor accepts setting of a priority for each of a plurality of types of information to be acquired from each of the plurality of terminals. The setting processor sets, based on the priority, an acquisition schedule indicating a schedule for acquiring each of the plurality of types of information. The acquisition processor acquires each of the plurality of types of information from each of the plurality of terminals in accordance with the acquisition schedule. A display processor that causes a display to display the plurality of types of information acquired by the acquisition processor.

13 Claims, 4 Drawing Sheets

(56) References Cited

U.S. PATENT DOCUMENTS

| | | | |
|---|---|---|---|
| 2008/0059718 A1* | 3/2008 | Tajima | G06F 3/0649 |
| | | | 711/148 |
| 2011/0182196 A1* | 7/2011 | Yunoki | H04L 12/2825 |
| | | | 370/252 |
| 2012/0017706 A1* | 1/2012 | Yoshida | G01N 30/8651 |
| | | | 73/866.3 |
| 2014/0036666 A1 | 2/2014 | Sanda et al. | |
| 2014/0268245 A1* | 9/2014 | Kawach | H04N 1/00244 |
| | | | 358/403 |
| 2015/0154675 A1* | 6/2015 | Todasco | G06Q 30/0631 |
| | | | 705/26.7 |
| 2016/0027169 A1* | 1/2016 | Iwadate | G01R 33/482 |
| | | | 382/131 |
| 2016/0144875 A1* | 5/2016 | Kim | B61L 25/021 |
| | | | 370/328 |
| 2016/0204995 A1 | 7/2016 | Sanda et al. | |
| 2016/0261481 A1 | 9/2016 | Ogata et al. | |
| 2018/0089860 A1* | 3/2018 | Ikuta | G06V 20/20 |
| 2018/0288083 A1* | 10/2018 | Yermakov | H04L 43/0817 |
| 2019/0347604 A1* | 11/2019 | Suenram | G06F 16/248 |

FOREIGN PATENT DOCUMENTS

| | | | | |
|---|---|---|---|---|
| JP | 2000259520 A | * | 9/2000 | |
| JP | 2000-357139 A | | 12/2000 | |
| JP | 2003-198994 | | 7/2003 | |
| JP | 2004-214785 | | 7/2004 | |
| JP | 2013120506 A | * | 6/2013 | |
| JP | 2014-33446 | | 2/2014 | |
| JP | 2016-163242 | | 9/2016 | |
| JP | 2019-040394 A | | 3/2019 | |
| WO | WO-2012171272 A1 | * | 12/2012 | H04W 48/04 |
| WO | WO-2018179366 A1 | * | 10/2018 | F25B 49/02 |

\* cited by examiner

FIG. 2

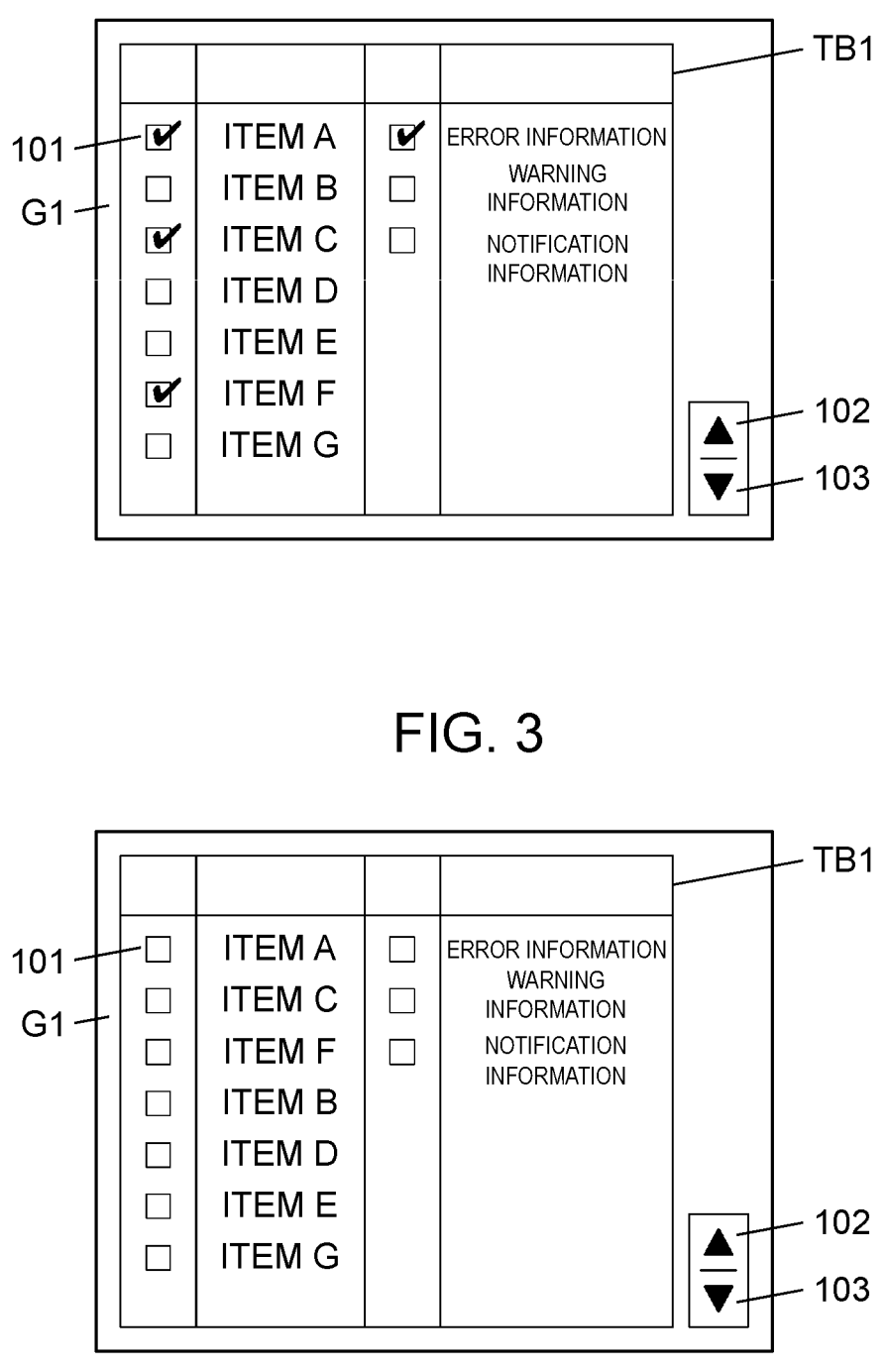

| | | | |
|---|---|---|---|
| ☑ | ITEM A | ☑ | ERROR INFORMATION |
| ☐ | ITEM B | ☐ | WARNING INFORMATION |
| ☑ | ITEM C | ☐ | NOTIFICATION INFORMATION |
| ☐ | ITEM D | | |
| ☐ | ITEM E | | |
| ☑ | ITEM F | | |
| ☐ | ITEM G | | |

FIG. 3

| | | | |
|---|---|---|---|
| ☐ | ITEM A | ☐ | ERROR INFORMATION |
| ☐ | ITEM C | ☐ | WARNING INFORMATION |
| ☐ | ITEM F | ☐ | NOTIFICATION INFORMATION |
| ☐ | ITEM B | | |
| ☐ | ITEM D | | |
| ☐ | ITEM E | | |
| ☐ | ITEM G | | |

TERMINAL MONITORING METHOD, PROGRAM, AND TERMINAL MONITORING SYSTEM

BACKGROUND

1. Technical Field

The present disclosure relates to a terminal monitoring method, a program, and a terminal monitoring system. More specifically, the present disclosure relates to a terminal monitoring method, a program, and a terminal monitoring system that monitor states of a plurality of terminals connected to a network.

2. Description of the Related Art

Unexamined Japanese Patent Publication No. 2000-259520 discloses a network management device (terminal monitoring system) that monitors a plurality of devices to be managed (terminals) installed in a network. The network management device periodically collects information on the devices to be managed that is installed in the network.

SUMMARY

In the network management device in the above configuration, when a number of devices to be managed that are monitoring targets increases, there is a possibility that communication traffic of the network increases.

An object of the present disclosure is to provide a terminal monitoring method, a program, and a terminal monitoring system capable of suppressing communication traffic.

A terminal monitoring method according to an aspect of the present disclosure is a terminal monitoring method for monitoring a plurality of terminals connected to a network. The terminal monitoring method includes: a process of accepting, a process of setting, a process of acquiring, and a process of displaying. In the process of accepting, setting of a priority is accepted for each of a plurality of types of information to be acquired from each of the plurality of terminals. In the process of setting, an acquisition schedule indicating a schedule for acquiring each of the plurality of types of information is set based on the priority. In the process of acquiring, each of the plurality of types of information from each of the plurality of terminals is acquired in accordance with the acquisition schedule. In the process of displaying, a display is made to display the plurality of types of information acquired in the process of acquiring.

A program according to an aspect of the present disclosure is a program for making one or more processors execute the terminal monitoring method.

A terminal monitoring system according to an aspect of the present disclosure is a terminal monitoring system that monitors a plurality of terminals connected to a network. The terminal monitoring system includes an acceptance processor, a setting processor, an acquisition processor, and a display processor. The acceptance processor accepts setting of a priority for each of a plurality of types of information to be acquired from each of the plurality of terminals. The setting processor sets, based on the priority, an acquisition schedule indicating a schedule for acquiring each of the plurality of types of information. The acquisition processor acquires each of the plurality of types of information from each of the plurality of terminals, in accordance with the acquisition schedule. A display processor that causes a display to display the plurality of types of information acquired by the acquisition processor The present disclosure makes it possible to suppress communication traffic.

BRIEF DESCRIPTION OF THE DRAWINGS

FIG. 2 is an explanatory diagram illustrating an example of a screen for assigning priorities to a plurality of types of information in the above terminal monitoring system;

FIG. 3 is an explanatory diagram illustrating an example of a screen where a plurality of types of information are rearranged in the above terminal monitoring system according to the priorities;

DETAILED DESCRIPTION

Exemplary Embodiment (1) Outline

Hereinafter, with reference to FIG. 1 an outline of a terminal monitoring method, a program, and a terminal monitoring system according to the present exemplary embodiment will be described.

Figure 1:
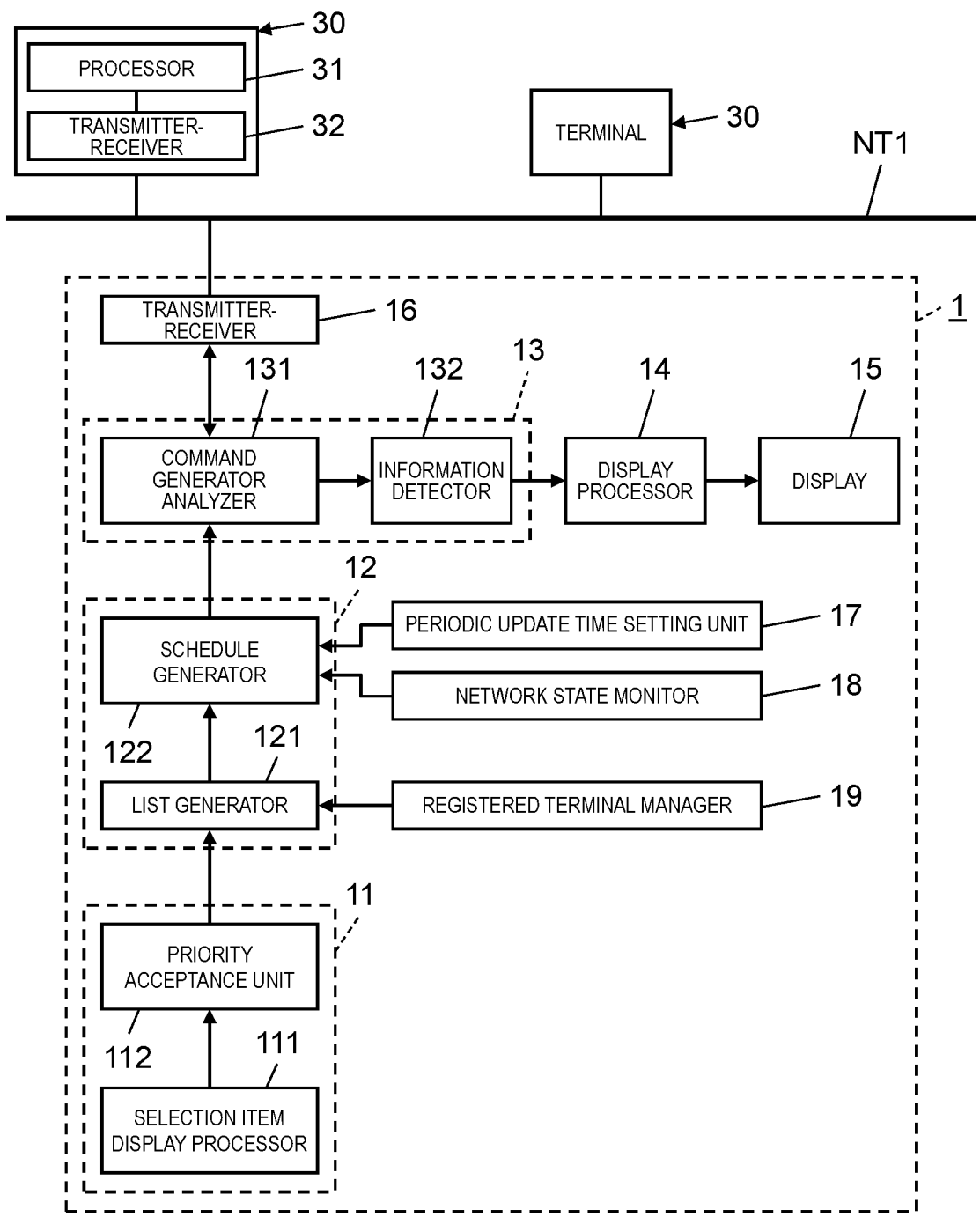
FIG. 1 is a schematic block diagram of a terminal monitoring system according to an exemplary embodiment of the present disclosure.

As illustrated in FIG. 1, the terminal monitoring method according to the present exemplary embodiment is a terminal monitoring method for monitoring a plurality of terminals 30 connected to network NT1. The terminal monitoring method includes a process of accepting, a process of setting, a process of acquiring, and a process of displaying. In the process of accepting, setting of a priority is accepted for each of a plurality of types of information to be acquired from each of the plurality of terminals 30. In the process of setting, an acquisition schedule indicating a schedule for acquiring each of the plurality of types of information is set on the basis of the priorities. In the process of acquiring, each of the plurality of types of information is acquired from each of the plurality of terminals 30 according to the acquisition schedule. In the process of displaying, a plurality of types of information acquired in the process of acquiring are displayed on a display.

This terminal monitoring method is, for example, a terminal monitoring method for monitoring states of a plurality of terminals 30 used in a facility. In the present exemplary embodiment, examples of the facility include non-residential facilities such as commercial facilities, theme parks, office buildings, schools, welfare facilities, hospitals, and factories and include facilities such as apartment buildings and detached houses. Non-residential facilities include theaters, movie theaters, community halls, game halls, complex facilities, restaurants, department stores, hotels, inns, kindergartens, libraries, museums, art galleries, underground malls, stations, airports, and the like. The facilities include not only buildings (buildings) but also outdoor facilities such as stadiums, parking lots, athletic grounds, and parks.

A "terminal" that is a monitoring target of the terminal monitoring method is, for example, a terminal having a communication function and being disposed at a plurality of places in a facility. Examples of this type of terminal include: a network camera, a projector, a display device, facility equipment such as lighting equipment or air conditioning equipment, and sensor equipment such as a temperature sensor or a security sensor. Further, the plurality of terminals 30 are not limited to terminals installed indoors, and may be terminals installed outdoors. Note that the plurality of terminals 30 are not limited to terminals used in a single facility, and may be terminals disposed in a distributed manner in a plurality of facilities. Further, the plurality of terminals 30 may be terminals installed and used in a moving body such as an aircraft, a ship, or a railroad vehicle. Further, the plurality of terminals 30 are not limited to the same types of terminals, and may be a plurality of types of terminals. In the following exemplary embodiment, a description will be given on a case where the plurality of terminals 30 are projectors.

The plurality of terminals 30 are connected to network NT1. Network NT1 may be a local area network (LAN) provided in a facility, or may be a network such as the Internet. In the terminal monitoring method of the present exemplary embodiment, the states of the plurality of terminals 30 are monitored by acquiring a plurality of types of information from the plurality of terminals 30. The plurality of types of information are information on the states of terminals 30, and include one or more types of first information and one or more types of second information whose contents are updated more frequently than the one or more types of first information. For example, the first information includes basic information common to the plurality of types of terminals 30, and the second information includes detailed information unique to individual terminals 30. The basic information is information whose content is updated less frequently than the detailed information (in other words, information that changes less frequently), and includes information of at least one item among items such as a name and model name of terminal 30, a type and a network address (for example, an IP address, a MAC address, or the like) of terminal 30, a communication setting, a power supply voltage, and a state of operation. The detailed information is information whose content is updated more frequently than the basic information. In a case where terminal 30 is a projector, the detailed information includes information of at least one of items such as image data of an image (a still image or a moving image) projected by the projector, an operating time of a lamp, an intake air temperature of a cooling fan for cooling, and a rotation speed of a cooling fan. Further, in a case where terminal 30 is a display device, the detailed information includes image data and the like displayed on the display device.

As described above, the plurality of types of information to be acquired from the plurality of terminals 30 can include first information (for example, basic information) and second information (for example, detailed information) whose content is updated more frequently than the first information. Since the content of the second information is updated more frequently than the content of the first information, the second information is preferably acquired more frequently than the first information. Conversely, since the content of the first information is updated less frequently than the content of the second information, the first information may be acquired less frequently than the second information.

In a terminal information acquisition method of the present exemplary embodiment, when the setting of the priority for each of the plurality of types of information is accepted by the process of accepting, the acquisition schedule indicating the schedule for acquiring each of the plurality of types of information is set by the process of setting, based on the priorities. In the process of acquiring, since each of the plurality of types of information is acquired from each of the plurality of terminals 30 according to the acquisition schedule, the frequency of acquiring the plurality of types of information can be changed depending the priorities. For example, when the acquisition schedule is set such that the information having a higher priority is acquired more frequently and the information having a lower priority is acquired less frequently, the communication traffic of the network can be reduced as compared with a case where the plurality of types of information are acquired at the same frequency. Therefore, it is possible to achieve a terminal monitoring method capable of suppressing the communication traffic. In addition, when the acquisition schedule is set such that the information having a higher priority is acquired more frequently, the information having a higher priority is updated more frequently compared to the information having a lower priority, and it is therefore possible to monitor the information having a higher priority while securing real-time performance.

The terminal monitoring method according to the present exemplary embodiment is performed on terminal monitoring system 1 as illustrated in FIG. 1 as an example. In other words, terminal monitoring system 1 is an aspect for embodying the terminal monitoring method described above. Terminal monitoring system 1 according to the present exemplary embodiment is a terminal monitoring system that monitors a plurality of terminals 30 connected to network NT1, and includes acceptance processor 11, setting processor 12, acquisition processor 13, and display processor 14. Acceptance processor 11 accepts setting of a priority for each of the plurality of types of information to be acquired from each of the plurality of terminals 30. On the basis of the priorities, setting processor 12 sets an acquisition schedule indicating a schedule for acquiring each of the plurality of types of information. Acquisition processor 13 acquires each of the plurality of types of information from each of the plurality of terminals 30 according to the acquisition schedule. Display processor 14 causes display 15 to display the plurality of types of information acquired by acquisition processor 13.

Here, terminal monitoring system 1 according to the present exemplary embodiment is mainly configured with a computer system including one or more processors and one or more memories. In other words, the terminal monitoring method according to the present exemplary embodiment is used on a computer system (terminal monitoring system 1). That is, the terminal monitoring method can also be embodied by a program. A program according to the present exemplary embodiment is a program for making one or more processors execute the terminal monitoring method according to the present exemplary embodiment.

(2) Details
(2.1) Configuration

Terminal monitoring system 1 of the present exemplary embodiment is a system for monitoring states of a plurality of terminals 30 connected via network NT1. Hereinafter, configurations of terminal monitoring system 1 and terminal 30 will be described with reference to FIG. 1.

(2.1.1) Terminal

Terminal 30 is a terminal that is a monitoring target of terminal monitoring system 1. In the present exemplary embodiment, a description will be given taking as an example a case where terminal 30 is a projector used in a facility to which terminal monitoring system 1 is applied.

Terminal 30 includes processor 31 and transmitter-receiver 32.

Transmitter-receiver 32 includes a communication module conforming to, for example, a LAN communication standard, and communicates with terminal monitoring system 1 via network NT1.

Processor 31 executes processing corresponding to a type of terminal 30. For example, in a case where terminal 30 is a projector that projects an image on a screen, processor 31 controls operations of a display that displays an image and a projection device that projects an image displayed on the display. In addition, when transmitter-receiver 32 receives a request command to request transmission of information about a state of terminal 30 from terminal monitoring system 1, processor 31 generates a response command including the information requested by the request command, and causes transmitter-receiver 32 to transmit the response command to terminal monitoring system 1.

(2.1.2) Terminal Monitoring System

As described above, terminal monitoring system 1 includes acceptance processor 11, setting processor 12, acquisition processor 13, and display processor 14. Terminal monitoring system 1 according to the present exemplary embodiment further includes display 15, transmitter-receiver 16, periodic update time setting unit 17, network state monitor 18, and registered terminal manager 19. Note that terminal monitoring system 1 does not necessarily include display 15, transmitter-receiver 16, periodic update time setting unit 17, network state monitor 18, and registered terminal manager 19, and some can be omitted as appropriate. Note that terminal monitoring system 1 has a computer system as a main configuration, and a calculation function of the computer system realizes acceptance processor 11, setting processor 12, acquisition processor 13, display processor 14, periodic update time setting unit 17, network state monitor 18, and registered terminal manager 19. In addition, terminal monitoring system 1 includes a user interface (UI) including an input device that accepts an operation input from a user and an output device for outputting information to the user. Here, the input device includes at least one of a keyboard, a mouse, and a voice input device, and the output device includes at least one of a display device such as a liquid crystal display and a printer.

Transmitter-receiver 16 includes, for example, a communication module conforming to a LAN communication standard, and communicates with each of the plurality of terminals 30 via network NT1.

Acceptance processor 11 accepts a priority set by a user using the user interface for each of the plurality of types of information to be acquired from each of the plurality of terminals 30. Acceptance processor 11 includes selection item display processor 111 and priority acceptance unit 112.

Selection item display processor 111 causes display 15 to display selection screen G1 (see FIG. 2) for a user to select information that the user desires to preferentially monitor, from among a plurality of types of information that can be acquired from the plurality of terminals 30.

On selection screen G1 there is displayed Table TB1 that shows a list of a plurality of types of information (including basic information and detailed information). In Table TB1, names of a plurality of types of information that can be acquired from terminal 30 are displayed in two columns. In the left column of Table TB1, item names (for example, items A to G) of the plurality of types of information that can be individually acquired from each terminal 30 are displayed. In a case where terminal 30 is a projector, the items of the plurality of types of information include, for example, items such as image data to be projected by the projector, an operating time of a lamp, a model name, and an intake air temperature of a cooling fan for cooling a lamp. In addition, a plurality of types of general information common to the plurality of terminals 30 are displayed in the right column of Table TB1. Examples of the type of the general information include error information related to an operation error of terminal 30, warning information for notifying an abnormality in terminal 30, and notification information for various notifications (for example, notifications related to maintenance) related to terminal 30.

Check boxes 101 are displayed on the left side of the item names and type names in Table TB1, and the user checks, using the input device, check box 101 corresponding to the item name and the type name desired to be preferentially acquired. When the user performs, by using the input device, an operation instructing sorting after checking check box 101, selection item display processor 111 causes display 15 to display Table TB1 in which an order has been rearranged so that the item name and the type name having high priorities are displayed on an upper side of each column. Here, the user may operate cursor up button 102 or cursor down button 103 to rearrange the plurality of item names and type names such that the selected item name or type name is located on the upper side of the column. FIG. 3 shows an example of Table TB1 after the rearrangement has been performed, and the item name and the type name having higher priorities are displayed higher in each column.

Priority acceptance unit 112 acquires information of the priorities that are assigned, on selection screen G1, to the plurality of item names and type names on the basis of whether check boxes 101 corresponding to the plurality of item names and type names are checked or not. Priority acceptance unit 112 assigns the priorities to all information that can be acquired with respect to each of the plurality of terminals 30, in other words, to the plurality of item names and type names. Then, priority acceptance unit 112 generates a selection list in which the plurality of item names and type names are associated with the priorities and outputs the selection list to setting processor 12. Here, priority acceptance unit 112 generates a selection list in which a plurality of item names and type names are rearranged according to the priorities associated with each item name and type name, and outputs the selection list to setting processor 12.

Periodic update time setting unit 17 sets an update period that is a time interval at which information is acquired from terminal 30, on the basis of a periodic update period having been input by the user using the user interface, and outputs the update period to setting processor 12.

Network state monitor 18 periodically collects network information about network NT1 to which terminal 30 and terminal monitoring system 1 are connected. The network information can include, for example, at least one piece of information regarding a communication speed, a communication amount (packet amount), a number of retransmissions, and a number of reconnections in network NT1. Network state monitor 18 monitors communication traffic in network NT1 on the basis of the network information. Specifically, the communication traffic is monitored based on information about network statistics of information transmitted and received by transmitter-receiver 16 of terminal monitoring system 1. Network state monitor 18 periodically outputs a result of monitoring the communication traffic to setting processor 12.

For each of a plurality of types of information that can be individually acquired from each of the plurality of terminals 30 that are monitoring targets, a request command for acquiring each information is registered in advance in registered terminal manager 19.

On the basis of the selection list that is input from acceptance processor 11, setting processor 12 sets the acquisition schedule indicating the schedule for acquiring each of the plurality of types of information.

Setting processor 12 includes list generator 121 and schedule generator 122.

To list generator 121, the selection list is input from acceptance processor 11, and management information is input from registered terminal manager 19. The selection list is a list in which item names and type names of the plurality of types of information desired to be acquired from terminals 30 are rearranged according to the priorities. List generator 121 acquires, from registered terminal manager 19, the request command for acquiring information of each of a plurality of types of item names and type names listed in the selection list. Then, list generator 121 generates an acquisition information list in which a request command for requesting each piece of information from terminals 30 is associated with information of the plurality of types of item names and type names listed in the selection list, and outputs the acquisition information list to schedule generator 122.

Schedule generator 122 receives the update period from periodic update time setting unit 17, the result of monitoring the communication traffic from network state monitor 18, and the acquisition information list from list generator 121. Schedule generator 122 generates the acquisition schedule indicating the schedule for acquiring information from terminals 30 based on the update period, the monitoring result of the communication traffic, and the acquisition information list. Schedule generator 122 generates the acquisition schedule in which timings of acquiring a plurality of pieces of information from terminals 30 are dispersed so that the communication traffic does not exceed a predetermined threshold value. Schedule generator 122 outputs the generated acquisition schedule to acquisition processor 13.

As described above, acquisition processor 13 acquires each of the plurality of types of information from each of the plurality of terminals 30, according to the acquisition schedule set by setting processor 12. Acquisition processor 13 includes command generator analyzer 131 and information detector 132.

Command generator analyzer 131 includes an internal timer that periodically generates timing information serving as a reference for acquisition timings of acquiring information from terminals 30. The acquisition schedule generated by setting processor 12 is input to command generator analyzer 131.

Based on the timing information generated by the internal timer and the acquisition schedule, command generator analyzer 131 determines, from among the plurality of types of information, one or more pieces of information that are acquisition targets at each acquisition timing. Command generator analyzer 131 generates a request command for requesting one or more pieces of information that are acquisition targets, and causes transmitter-receiver 16 to transmit the generated request command to terminals 30 as request destinations.

In addition, when receiving the response commands transmitted from terminals 30 in response to the request command, transmitter-receiver 16 outputs the response commands to command generator analyzer 131. Command generator analyzer 131 extracts terminal information including the one or more pieces of information that are acquisition targets from the response commands and outputs the terminal information to information detector 132.

Information detector 132 analyzes the terminal information having been input from command generator analyzer 131 and acquires the one or more pieces of information included in the terminal information. When acquiring the one or more pieces of information related to each terminal 30, information detector 132 updates the state of each terminal 30 on the basis of the acquired one or more pieces of information, and outputs state information indicating the states of terminals 30 to display processor 14.

On the basis of the state information having been input from information detector 132, display processor 14 display the state information of terminals 30 that are monitoring targets, on the screen of display 15. As a result, the user of terminal monitoring system 1 can monitor the states of terminals 30 on the basis of the screen displayed on display 15.

(2.2) Description of Operation

Figure 4:
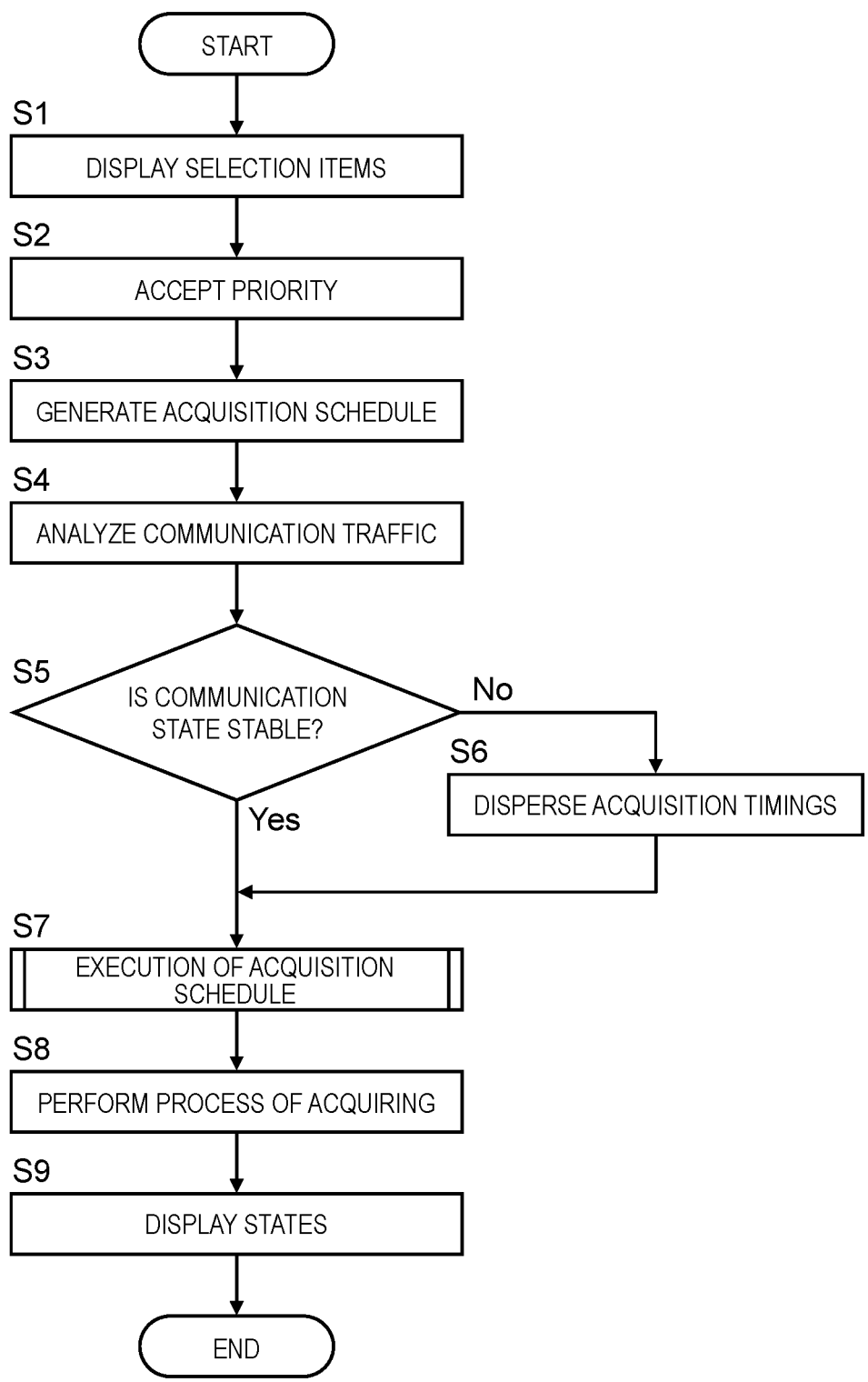
FIG. 4 is a flowchart for describing an operation of the above terminal monitoring system.
Figure 5:
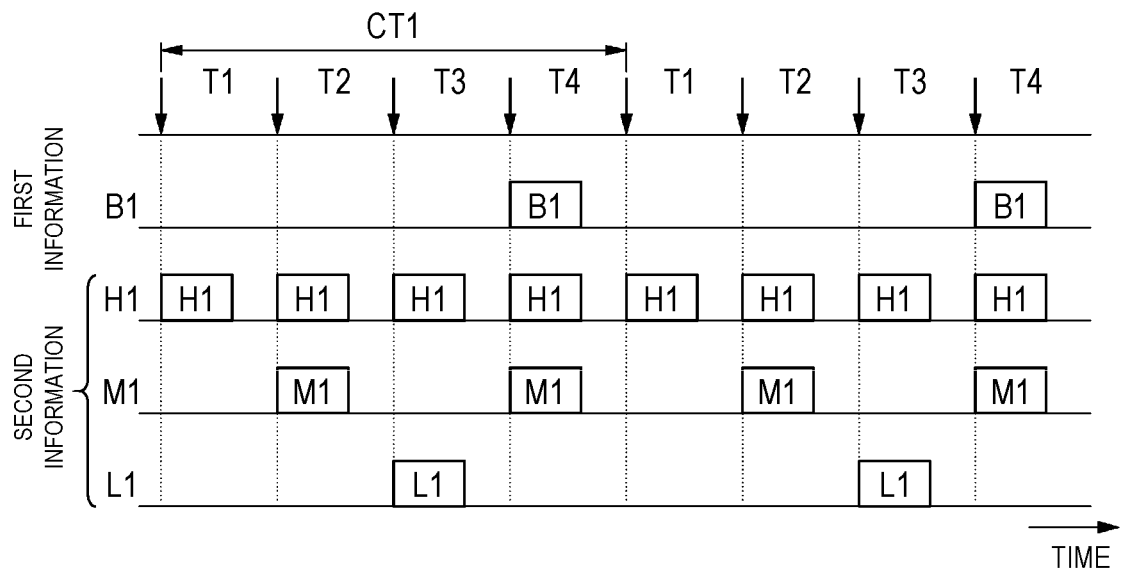
FIG. 5 is a time chart illustrating timings at which the above terminal monitoring system acquires information.
Figure 6:
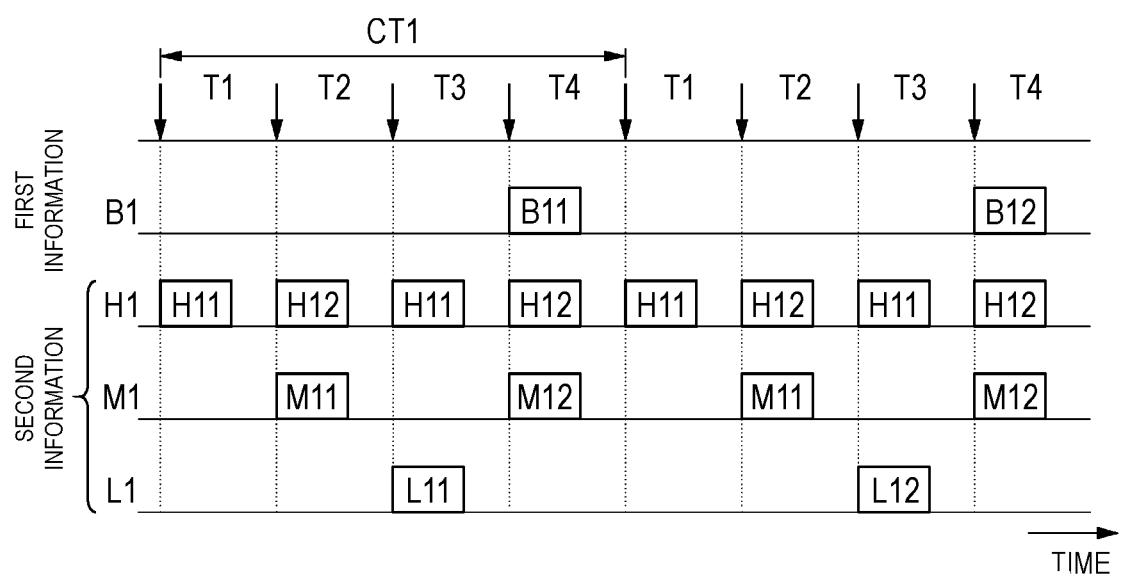
FIG. 6 is a time chart illustrating timings at which the above terminal monitoring system acquires information.

With reference to FIGS. 4 to 6, a description will be given on an operation of monitoring terminals 30 performed by terminal monitoring system 1 according to the present exemplary embodiment.

When terminal monitoring system 1 performs the terminal monitoring method, selection item display processor 111 causes display 15 to display selection screen G1 as illustrated in FIG. 2 (step S1). When the user selects information desired to be preferentially acquired, from among the information of the plurality of item names and type names displayed on selection screen G1, selection item display processor 111 rearranges, on selection screen G1, the information of the plurality of item names and type names in a descending order of priority. Then, selection item display processor 111 causes display 15 to display a screen (see FIG. 3) on which the information of the plurality of item names and type names is rearranged in a descending order of priority. In the example of FIG. 3, according to the priorities set by the user, the items are rearranged in the order of item A, item C, item F, item B, item D, item E, and item G. In this way, when the priority is assigned to each of the plurality of types of information according to the selection operation of the user on selection screen G1, priority acceptance unit 112 receives the setting of the priority for each of the plurality of types of information according to the selection operation of the user on selection screen G1 (step S2). Priority acceptance unit 112 generates the selection list in which the plurality of types of information are associated with the priorities, and outputs the selection list to setting processor 12. In the present exemplary embodiment, since a priority is assigned to each of the plurality of types of information according to the selection operation of the user, the user can set desired information as information to be preferentially monitored, by assigning a high priority to the desired information. In other words, the plurality of types of information that are acquisition targets includes a plurality of types of second information, and acceptance processor 11 accepts the setting of the priorities for the plurality of types of second information for each type. Therefore, the priorities for the plurality of types of second information can be finely set for each type.

As described above, when acceptance processor 11 receives, in a state where the plurality of types of information are displayed on the screen of display 15, setting to change a priority for change target information among the plurality of types of information, acceptance processor 11 rearranges the plurality of types of information on the basis of the priorities and displays the rearranged information on the screen of display 15. As a result, the user of terminal monitoring system 1 can set the priority for each of the plurality of types of information while viewing the screen of display 15.

When the selection list is input from acceptance processor 11, list generator 121 of setting processor 12 extracts, from registered terminal manager 19, the request command for acquiring information of a plurality of types of item names and type names listed in the selection list. List generator 121 generates the acquisition information list in which the request command associated with the information of the plurality of types of item names and type names listed in the selection list, and outputs the acquisition information list to schedule generator 122.

Here, periodic update time setting unit 17 sets the update period that is a time interval at which information is acquired, on the basis of the periodic update period having been input by the user using the user interface, and outputs the update period to schedule generator 122.

Schedule generator 122 generates the acquisition schedule for acquiring the plurality of types of information, on the basis of the update period and the acquisition information list (step S3). FIG. 5 illustrates an example of the acquisition schedule generated by schedule generator 122. FIG. 5 illustrates the acquisition schedule in a case where first information B1 and three types of second information H1, M1, and L1 are acquired. Among three types of second information H1, M1, and L1, second information H1 is information having the highest priority, and second information L1 is information having the lowest priority. In addition, since first information B1 is updated less frequently than second information H1, M1, and L1, the priority for first information B1 is set lower than the priority for second information H1, M1, and L1.

Here, schedule generator 122 sets the acquisition schedule so as to acquire information in each of update periods T1 to T4 obtained by dividing a periodic update period CT1 into four. Regarding this acquisition schedule, the acquisition schedule is set such that first information B1 is acquired in update period T4 among update periods T1 to T4, and the content of the information is updated once every four times. The acquisition schedule is set such that second information L1 having the lowest priority is acquired in update period T3, and the content of the information is updated once every four times. The acquisition schedule is set such that second information M1 having about medium priority is acquired in update periods T2 and T4, and the content of the information is updated once every two times. The acquisition schedule is set such that second information H1 having the highest priority is acquired in each of update periods T1 to T4, and the content of the information is updated in each of update periods T1 to T4. As described above, setting processor 12 (schedule generator 122) sets the acquisition schedule so as to acquire one or more types of second information H1 and M1 at a higher frequency than the one or more types of first information B1. Since second information H1 and M1 having a high content update frequency is acquired at a higher frequency than first information B1, there is an advantage that the real-time performance in the case of monitoring second information H1 and M1 is improved and, at the same time, an increase in communication traffic is suppressed.

In the example of FIG. 5, setting processor 12 (schedule generator 122) sets the acquisition schedule so as to acquire the second information having a relatively high priority (an example of third information) among the plurality of types of second information H1, M1, and L1, at a higher frequency than the second information having a relatively low priority (an example of fourth information).

Further, schedule generator 122 (setting processor 12) sets the acquisition schedule so as to acquire each of the plurality of types of information that are acquisition targets at least once in the predetermined periodic update period CT1 from each of the plurality of terminals 30. As a result, since each of the plurality of types of information that are acquisition targets can be acquired at least once in one periodic update period CT1, all the information that are acquisition targets is updated at least once every time the periodic update period CT1 elapses.

After generating the acquisition schedule, schedule generator 122 compares an analysis result of the communication traffic periodically input from network state monitor 18 with a threshold value to determine whether a communication state is stable (step S5).

Here, network state monitor 18 collects, as the network information of network NT1, for example, a transmission packet amount, a reception packet amount, a number of retries, error information, a number of reconnections, and other statistical values at each point of timing. For example, as illustrated in Table 1 below, network state monitor 18 acquires transmission packet amounts PktT(t1) and PktT(t2) at time t1 and time t2 (where t2>t1), and calculates a difference ΔPktT(t2-t1) between PktT(t1) and PktT(t2). Network state monitor 18 acquires reception packet amounts PktR(t1) and PktR(t2) at time t1 and time t2, and calculates a difference ΔPktR(t2-t1) between the reception packet amounts PktR(t1) and PktR(t2). Network state monitor 18 acquires numbers of retries Rty(t1) and Rty(t2) at time t1 and time t2, and calculates a difference ΔRty(t2-t1) between Rty(t1) and Rty(t2). Network state monitor 18 acquires error information (for example, error rates) Err(t1) and Err(t2) at time t1 and time t2, and calculates a difference ΔErr(t2-t1) between Err(t1) and Err(t2). Network state monitor 18 acquires numbers of reconnections Recn(t1) and Recn (t2) at time t1 and time t2, and calculates a difference ΔRecn(t2-t1) between Recn(t1) and Recn(t2). In addition, network state monitor 18 acquires other statistical values Other(t1) and Other(t2) at time t1 and time t2, and calculates a difference ΔOther(t2-t1) between Other(t1) and Other(t2).

TABLE 1

| | Measurement information | | Amount |
| --- | --- | --- | --- |
| | Time t1 | Time t2 | of change |
| Transmission packet | PktT(t1) | PktT(t2) | ΔPktT(t2 − t1) |
| Reception packet | PktR(t1) | PktR(t2) | ΔPktR(t2 − t1) |
| Number of retries | Rty(t1) | Rty(t2) | ΔRty(t2 − t1) |
| Error information | Err(t1) | Err(t2) | ΔErr(t2 − t1) |
| Number of reconnections | Recn(t1) | Recn(t2) | ΔRecn(t2 − t1) |
| Other statistical values | Other(t1) | Other(t2) | ΔOther(t2 − t1) |

Here, using the difference ΔPktT(t2-t1) in the transmission packet amount and the difference ΔPktR(t2-t1) in the reception packet amount, network state monitor 18 calculates an effective speed Sp in network NT1 by following Mathematical Expression 1.

$$Sp = \frac{\Delta PktT(t2 - t1) + \Delta PktR(t2 - t1)}{(t2 - t1)} \quad \text{[Mathematical Expression 1]}$$

Network state monitor 18 outputs a calculation result of the effective speed Sp to schedule generator 122 as the analysis result of the communication traffic. Schedule generator 122 determines whether the communication state in network NT1 is stable or not by comparing a magnitude of the calculation result of the effective speed Sp with a threshold value. That is, if the calculation result of the effective speed Sp is more than or equal to the threshold value, schedule generator 122 determines that the communication state is stable, and if the calculation result of the effective speed Sp is less than the threshold value, schedule generator 122 determines that the communication state is not stable.

If it is determined in step S5 that the communication state is stable, acquisition processor 13 performs the acquisition schedule generated in step S3 (step S7).

On the other hand, if it is determined in step S5 that the communication state is not stable, schedule generator 122 changes the acquisition schedule so as to disperse the timings of acquiring information in order to suppress the communication traffic (step S6).

FIG. 6 illustrates an example of the acquisition schedule after being changed in a changing process in step S6. In this acquisition schedule, first information B1 is divided into two pieces of first information B11 and first information B12, and the acquisition schedule is changed such that first information B11 and B12 are each acquired in one of update periods T4 in two periodic update periods CT1. That is, first information B1 is acquired in two update periods T4.

Similarly, second information L1 having a lowest priority is divided into two pieces of second information L11 and second information L12, and the acquisition schedule is changed such that second information L11 and L12 are each acquired in one of update periods T3 in two periodic update periods CT1. That is, the second information L1 having the lowest priority is acquired in two update periods T3.

Second information M1 having a medium priority is divided into two pieces of second information M11 and second information M12, and the acquisition schedule is changed such that second information M11 and M12 are respectively acquired in update periods T2 and T4.

Second information H1 having the highest priority is divided into two pieces of second information H11 and second information H12, and the acquisition schedule is changed such that second information H11 and second information H12 are alternately acquired in update periods T1 to T4.

As described above, in the present exemplary embodiment, setting processor 12 (schedule generator 122) sets the acquisition schedule on the basis of the priorities and the communication traffic of network NT1, and it is therefore possible to set the acquisition schedule in further consideration of the communication traffic. Specifically, when the communication traffic of network NT1 is more than the threshold value, setting processor 12 sets the acquisition schedule such that the frequency of acquiring each of the plurality of types of information is lower than that when the communication traffic is less than or equal to the threshold. Since the acquisition schedule is changed in this manner, it is possible to reduce the amount of information to be acquired in each of the update periods T1 to T4, and as a result, the communication traffic can be suppressed.

When schedule generator 122 has changed, in step S6, the acquisition schedule so as to suppress the communication traffic, acquisition processor 13 performs the acquisition schedule changed in step S6 (step S7).

Acquisition processor 13 transmits, according to the acquisition schedule, a request command for acquiring acquisition target information from transmitter-receiver 16 to target terminals 30 in each update period. When receiving from terminals 30 response commands corresponding to the request command, transmitter-receiver 16 outputs the received response commands to acquisition processor 13. Acquisition processor 13 analyzes the response commands from terminals 30 to acquire information that has been requested to be transmitted (step S8), and outputs the acquired information to display processor 14.

When the information acquired by the process of acquiring is input from acquisition processor 13 to display processor 14, display processor 14 performs the process of displaying to display the information on display 15 (step S9). The user of terminal monitoring system 1 can grasp the states of terminals 30 that are monitoring targets, by checking the information displayed on display 15.

Here, in terminal monitoring system 1 of the present exemplary embodiment, information is acquired from each terminal 30 at a frequency of acquisition depending on the priority set by the user for each piece of information. Therefore, by making the frequency of acquisition for the information having a low priority lower than the frequency of acquisition for the information having a high priority, it is possible to suppress the communication traffic of network NT1. Further, by making the frequency of acquisition for the information having a high priority higher than the frequency of acquisition for the information having a low priority, it is possible to monitor the information having the high priority with higher real-time performance.

(3) Variations

The above exemplary embodiment is merely one of various exemplary embodiments of the present disclosure. The above exemplary embodiment can be variously modified depending on design and the like as long as the object of the present disclosure can be achieved. In addition, a function similar to that of terminal monitoring system 1 may be embodied by a terminal monitoring method, a computer program, a non-transitory recording medium in which a program is recorded, or the like.

Hereinafter, variations of the above exemplary embodiment will be recited. The variations described below can be applied in appropriate combination.

Terminal monitoring system 1 in the present disclosure includes a computer system. The computer system mainly includes a processor and a memory as hardware. The processor executes a program recorded in the memory of the computer system to realize a function as terminal monitoring system 1 in the present disclosure. The program may be recorded in advance in the memory of the computer system, may be provided through a telecommunication line, or may be provided by being recorded in a non-transitory recording medium readable by the computer system such as a memory card, an optical disk, or a hard disk drive. The processor of the computer system includes one or a plurality of electronic circuits including a semiconductor integrated circuit (IC) or a large-scale integrated circuit (LSI). The integrated circuit such as an IC or an LSI in this disclosure is called differently depending on a degree of integration, and includes an integrated circuit called a system LSI, a very large scale integration (VLSI), or an ultra large scale integration (ULSI). Further, the following device can be employed as the processor: a field-programmable gate array (FPGA) that is programmed after being manufactured as an LSI, or a logic device in which it is possible to reconfigure a bonding relationship inside an LSI or a circuit section inside the LSI.

The plurality of electronic circuits may be integrated into one chip or may be provided in a distributed manner on a plurality of chips. The plurality of chips may be aggregated in one device or may be provided in a distributed manner in a plurality of devices. The computer system in this disclosure includes a microcontroller having one or more processors and one or more memories. Therefore, the microcontroller is also constituted by one or a plurality of electronic circuits including a semiconductor integrated circuit or a large-scale integrated circuit.

In addition, it is not essential to terminal monitoring system 1 that a plurality of functions in terminal monitoring system 1 are aggregated in one housing, and the components of terminal monitoring system 1 may be disposed in a distributed manner in a plurality of housings. Further, at least a part of functions of terminal monitoring system 1, for example, some functions of terminal monitoring system 1 may be realized by a cloud (cloud computing) or the like.

In the above exemplary embodiment, network state monitor 18 analyzes traffic by calculating the effective speed Sp of the communication communication in network NT1, but the communication traffic may be analyzed by calculating an evaluation value other than the effective speed Sp.

For example, network state monitor 18 may analyze the communication traffic by using the above effective speed, number of retransmissions, and error information (for example, an error rate). For example, network state monitor 18 may calculate an error evaluation value En by following Mathematical Expression 2 using the effective speed, the number of retransmissions, and the error information, and may output the error evaluation value En to schedule generator 122 as the analysis result of the communication traffic.

$$En = \frac{Sp}{\Delta Rty(t2 - t1) + \Delta Err(t2 - t1)}$$ [Mathematical Expression 2]

In addition, schedule generator 122 may set a weighting factor according to a magnitude of a value of other network information related to network NT1, and may determine whether the communication state is stable or not from a magnitude relationship between a value obtained by multiplying the evaluation value by the weighting factor and a threshold value.

Further, in the above exemplary embodiment, schedule generator 122 determines whether the communication state is stable or not by comparing magnitudes between the analysis result of the communication traffic and the threshold value. However, a plurality of threshold values may be provided, and the communication state may be determined into a plurality of levels. Then, schedule generator 122 may set the acquisition schedule more finely by setting the acquisition schedules each corresponding to one of the plurality of levels of the communication state.

In the above exemplary embodiment, in the comparison between two values of the analysis result of the communication traffic and the threshold value, the expression "more than" is used, but the expression "more than or equal to" may be used instead. That is, when the two values are compared, whether the case where two values are the same is included or not can be arbitrarily changed depending on how a reference value or the like is set. Therefore, there is no technical difference between "more than" and "more than or equal to". Similarly, instead of the expression "less than or equal to" used above, the expression "less than" may be used.

Conclusion

As described above, a terminal monitoring method of the first aspect is a terminal monitoring method for monitoring plurality of terminals (30) connected to network (NT1). This terminal monitoring method includes a process of accepting, a process of setting, a process of acquiring, and a process of displaying. In the process of accepting, setting of a priority is accepted for each of a plurality of types of information to be acquired from each of the plurality of terminals (30). In the process of setting, an acquisition schedule indicating a schedule for acquiring each of the plurality of types of information is set on the basis of the priorities. In the process of acquiring, each of the plurality of types of information is acquired from each of the plurality of terminals (30) according to the acquisition schedule. In the process of displaying, a plurality of types of information acquired in the process of acquiring are displayed on display (15).

With this aspect, when the setting of the priority for each of the plurality of types of information is accepted by the process of accepting, the acquisition schedule indicating the schedule for acquiring each of the plurality of types of information is set by the process of setting, based on the priorities. In the process of acquiring, since each of the plurality of types of information is acquired from each of the plurality of terminals (30) according to the acquisition schedule, the frequency of acquiring the plurality of types of information can be changed depending the priorities. For example, when the acquisition schedule is set such that the information having a higher priority is acquired more frequently and the information having a lower priority is acquired less frequently, the communication traffic of the network can be reduced as compared with a case where the plurality of types of information are acquired at the same frequency. Therefore, it is possible to achieve a terminal monitoring method capable of suppressing the communication traffic.

Regarding a terminal monitoring method of a second aspect, in the first aspect, in the process of accepting, when setting to change a priority for change target information among the plurality of types of information is received in a state where the plurality of types of information are displayed on the screen of display (15), the plurality of types of information are rearranged on the basis of the priorities, and the rearranged information is displayed on the screen of display (15).

According to this aspect, a user of terminal monitoring system 1 can set the priority for each of the plurality of types of information while viewing the screen of display (15).

Regarding a terminal monitoring method of a third aspect, in the first or second aspect, the plurality of types of information includes one or more types of first information (B1) and one or more types of second information (H1, M1) whose contents are updated more frequently than the one or more types of first information (B1). In the process of acquiring, the acquisition schedule is set so as to acquire the one or more types of second information (H1, M1) at a higher frequency than the one or more types of first information (B1).

With this aspect, there is an advantage that real-time performance when the second information (H1, M1) is monitored is improved and, at the same time, an increase in communication traffic is suppressed.

Regarding a terminal monitoring method of a fourth aspect, in the third aspect, the plurality of types of information includes a plurality of types of second information (H1, M1, L1). In the process of accepting, the setting of the priority is accepted for each type of the plurality of types of second information (H1, M1, L1).

With this aspect, the priority can be set for each type of the plurality of types of second information (H1, M1, L1).

Regarding a terminal monitoring method of a fifth aspect, in the fourth aspect, in the process of setting, the acquisition schedule is set to acquire second information having a relatively high priority among the plurality of types of second information (H1, M1, L1), at a higher frequency than second information having a relatively low priority.

With this aspect, there is an advantage that real-time performance is improved in a case of monitoring the second information having a higher priority and, at the same time, an increase in communication traffic is suppressed.

Regarding a terminal monitoring method of a sixth aspect, in any one of the first to fifth aspects, in the process of setting, the acquisition schedule is set to acquire each of the plurality of types of information from each of the plurality of terminals (30) at least once in a predetermined periodic update period.

With this aspect, a content of each piece of information can be updated at least once every time a predetermined periodic update period elapses.

In a terminal monitoring method of a seventh aspect, in any one of the first to sixth aspects, in the process of setting, the acquisition schedule is set based on the priorities and the communication traffic of network (NT1).

With this aspect, the acquisition schedule can be set in consideration of the communication traffic.

Regarding a terminal monitoring method of an eighth aspect, in the seventh aspect, in the process of setting, when the communication traffic of network (NT1) is more than a threshold value, the acquisition schedule is set so as to acquire each of the plurality of types of information at a lower frequency than when the communication traffic is less than or equal to the threshold value.

With this aspect, the communication traffic can be suppressed to be less than or equal to the threshold value.

A program of a ninth aspect is a program for making one or more processors execute the terminal monitoring method of any one of the first to eighth aspects.

With this aspect, communication traffic can be suppressed.

Terminal monitoring system (1) of a tenth aspect is terminal monitoring system (1) that monitors a plurality of terminals (30) connected to network (NT1). Terminal monitoring system (1) includes acceptance processor (11), setting processor (12), acquisition processor (13), and display processor (14). Acceptance processor (11) accepts setting of a priority for each of the plurality of types of information to be acquired from each of the plurality of terminals (30). On the basis of the priorities, setting processor (12) sets an acquisition schedule indicating a schedule for acquiring each of the plurality of types of information. According to the acquisition schedule, acquisition processor (13) acquires each of the plurality of types of information from each of the plurality of terminals (30). Display processor (14) causes display (15) to display the plurality of types of information acquired by acquisition processor (13).

With this aspect, when acceptance processor (11) accepts the setting of the priority for each of the plurality of types of information, setting processor (12) sets, based on the priority order, the acquisition schedule indicating the schedule for acquiring each of the plurality of types of information. Since acquisition processor (13) acquires, according to the acquisition schedule, each of the plurality of types of information from each of the plurality of terminals (30), the frequency of acquiring the plurality of types of information can be changed depending the priorities. For example, when the acquisition schedule is set such that the information having a higher priority is acquired more frequently and the information having a lower priority is acquired less frequently, the communication traffic of the network can be reduced as compared with a case where the plurality of types of information are acquired at the same frequency. Therefore, it is possible to achieve a terminal monitoring method capable of suppressing the communication traffic.

Various configurations (including variations) of terminal monitoring system (1) according to the above exemplary embodiment are not limited to the above aspects and can be embodied by a terminal monitoring method performed by terminal monitoring system (1), a (computer) program, a non-transitory recording medium recording the program, or the like.

The configurations according to the second to eighth aspects are not essential to the terminal monitoring method, and can be omitted as appropriate.

What is claimed is:

1. A terminal monitoring method for monitoring a plurality of terminals connected to a network, the terminal monitoring method comprising:

accepting setting of a priority for each of a plurality of types of information to be acquired from each of the plurality of terminals;

generating an acquisition schedule indicating a schedule for acquiring each of the plurality of types of information, based on the priority;

acquiring each of the plurality of types of information from each of the plurality of terminals in accordance with the acquisition schedule; and displaying on a display the plurality of types of information acquired in the acquiring;

wherein the plurality of types of information includes one or more types of first information and one or more types of second information whose contents are updated more frequently than contents of the one or more types of first information, wherein a priority for the one or more types of second information is higher than a priority for the one or more types of first information, wherein the generating includes when the communication traffic of the network is more than a threshold value, generating the acquisition schedule to acquire at least one of the plurality of types of information at a lower frequency than when the communication traffic is less than or equal to the threshold value so as to dividedly acquire a plurality of pieces of the at least one of the plurality of types of information and so as to reduce an amount of acquired data for each of the plurality of types of information per unit time by dispersing a timing of the acquisition of each of the plurality of pieces of the at least one of the plurality of types of information, and wherein, in the displaying on the display the plurality of types of information acquired in the acquiring, receiving a setting to change the priority among the plurality of types of information acquired from each of the plurality of terminals, and rearranging the plurality of types of information based on the changed priority, and displaying the rearranged plurality of types of information on the display.

2. The terminal monitoring method according to claim 1, wherein the displaying includes:

accepting setting to change a priority for change target information among the plurality of types of information in a state where the plurality of types of information are being displayed on the display;

rearranging the plurality of types of information based on the priority having been changed; and displaying on the display the plurality of types of information having been rearranged.

3. The terminal monitoring method according to claim 1, wherein the generating includes generating the acquisition schedule to acquire the one or more types of second information at a higher frequency than the one or more types of first information.

4. The terminal monitoring method according to claim 1, wherein the plurality of types of information includes one or more types of first information and a plurality of types of second information whose contents are updated more frequently than contents of the one or more types of first information, the accepting includes accepting the setting of the priority for each of the plurality of types of second information, and the generating includes generating the acquisition schedule to acquire the plurality of types of second information at a higher frequency than the one or more types of first information.

5. The terminal monitoring method according to claim 4, wherein the plurality of types of second information includes third information and fourth information, a priority for the fourth information being lower than a priority for the third information, and the generating includes generating the acquisition schedule to acquire the third information at a higher frequency than the fourth information.

6. The terminal monitoring method according to claim 1, wherein the generating includes generating the acquisition schedule to acquire each of the plurality of types of information from each of the plurality of terminals at least once in a predetermined periodic update period.

7. The terminal monitoring method according to claim 1, wherein the generating includes generating the acquisition schedule based on the priority and communication traffic of the network.

8. The terminal monitoring method according to claim 7, wherein the generating includes when the communication traffic of the network is more than the threshold value, generating the acquisition schedule to acquire each of the plurality of types of information at a lower frequency than when the communication traffic is less than or equal to the threshold value.

9. A non-transitory computer readable medium storing a program for making one or more processors execute the terminal monitoring method according to claim 1.

10. The terminal monitoring method according to claim 1, wherein when the communication traffic is less than or equal to the threshold value, the at least one of the plurality of types of information are acquired without dividing the at least one of the plurality of types of information into the plurality of pieces.

11. The terminal monitoring method according to claim 1, further comprising sending a request command to at least one of the plurality of terminals to request transmission of the at least one of the plurality of types of information.

12. The terminal monitoring method according to claim 1, wherein, the generating includes when the communication traffic of the network is more than the threshold value, generating the acquisition schedule to acquire entire data of at least one of the plurality of types of information at a lower frequency than when the communication traffic is less than or equal to the threshold value.

13. A terminal monitoring system for monitoring a plurality of terminals connected to a network, the terminal monitoring system comprising a computer system, wherein the computer system is configured to:

accept setting of a priority for each of a plurality of types of information to be acquired from each of the plurality of terminals;

generate an acquisition schedule indicating a schedule for acquiring each of the plurality of types of information, based on the priority;

acquire each of the plurality of types of information from each of the plurality of terminals in accordance with the acquisition schedule by an acquisition processor; and cause a display to display the plurality of types of information acquired by the acquisition processor;

wherein the plurality of types of information includes one or more types of first information and one or more types of second information whose contents are updated more frequently than contents of the one or more types of first information, wherein a priority for the one of more types of second information is higher than a priority for the one or more types of first information, wherein the generating includes when the communication traffic of the network is more than a threshold value, generating the acquisition schedule to acquire at least one of the plurality of types of information at a lower frequency than when the communication traffic is less than or equal to the threshold value so as to dividedly acquire a plurality of pieces of the at least one of the plurality of types of information and so as to reduce an amount of acquired data for each of the plurality of types of information per unit time by dispersing a timing of the acquisition of each of the plurality of pieces of the at least one of the plurality of types of information, and wherein, in the displaying on the display the plurality of types of information acquired in the acquiring, receiving a setting to change the priority among the plurality of types of information acquired from each of the plurality of terminals, and rearranging the plurality of types of information based on the changed priority, and displaying the rearranged plurality of types of information on the display.

* * * * *